(12) United States Patent
Luo et al.

(10) Patent No.: US 8,555,946 B2
(45) Date of Patent: Oct. 15, 2013

(54) APPARATUS FOR MANUFACTURING POLE-PIECE POCKETS

(75) Inventors: Chenghua Luo, Shenzhen (CN); Rukun Yang, Shenzhen (CN)

(73) Assignee: Geesun Automation Technology Co., Ltd., Shenzhen (CN)

( * ) Notice: Subject to any disclaimer, the term of this patent is extended or adjusted under 35 U.S.C. 154(b) by 74 days.

(21) Appl. No.: 12/988,258

(22) PCT Filed: Sep. 21, 2009

(86) PCT No.: PCT/CN2009/074058
§ 371 (c)(1),
(2), (4) Date: Oct. 15, 2010

(87) PCT Pub. No.: WO2010/060318
PCT Pub. Date: Jun. 3, 2010

(65) Prior Publication Data
US 2011/0214401 A1 Sep. 8, 2011

(30) Foreign Application Priority Data
Nov. 28, 2008 (CN) ..................... 2008 2 0214113 U (51) Int. Cl.
*B29C 65/00* (2006.01)
*B32B 37/00* (2006.01)
*B32B 38/04* (2006.01)
*B32B 38/10* (2006.01)

(52) U.S. Cl.
USPC ........... 156/515; 156/522; 156/530; 156/552; 156/583.1; 493/189; 493/194; 493/203; 493/206; 493/209; 53/455

(58) Field of Classification Search
USPC .............. 156/515, 522, 530, 552, 583.1, 251; 493/189, 194, 203, 206, 209; 53/455
See application file for complete search history.

(56) References Cited

U.S. PATENT DOCUMENTS 2,697,055 A * 12/1954 Finholt ......................... 156/184
3,388,458 A *  6/1968 Logan ............................. 29/596
3,577,309 A *  5/1971 Pendleton ..................... 428/390

(Continued)

FOREIGN PATENT DOCUMENTS

| CN | 2375442 Y | 4/2000 |
|----|-----------|--------|
| CN | 1866588 A | 11/2006 |

*Primary Examiner* — Linda L Gray
(74) *Attorney, Agent, or Firm* — Lathrop & Gage LLP (57) ABSTRACT

Disclosed is a apparatus for manufacturing pole-piece pockets, comprising a framework, an pole-piece supplying assembly, an pole-piece transporting and regulating assembly, a vertically thermal-welding assembly, a transversely thermal-welding assembly, a film clamping and drawing assembly, and a film cutting assembly for cutting the films. The vertically thermal-welding assembly comprises a press welding cutter having two blades for simultaneously welding the two lateral edges of the pole-piece pocket. The transversely thermal-welding assembly comprises a first thermal welding cutter for welding the base of the pole-piece pocket and a second thermal welding cutter for welding the opening of the pole-piece pocket. The press welding cutter has two blades so that the two lateral edges of a pole-piece pocket can be welded in just one welding operation. Thus, the parallelity and welding consistency of the welding joints can be ensured. Moreover, the welding efficiency and quality are increased, and the risk of malfunction is decreased.

13 Claims, 10 Drawing Sheets

(56) References Cited

U.S. PATENT DOCUMENTS

| | | | | |
|---|---|---|---|---|
| 3,759,734 A | * | 9/1973 | Mendelsohn | 428/184 |
| 4,170,505 A | * | 10/1979 | Zgraggen | 156/162 |
| 4,263,712 A | | 4/1981 | Schroder | |
| 4,661,183 A | * | 4/1987 | Beard | 156/172 |
| 5,375,390 A | | 12/1994 | Frigo et al. | |
| 5,450,709 A | * | 9/1995 | Steding | 53/465 |
| 5,555,786 A | * | 9/1996 | Fuller | 83/663 |
| 6,670,072 B2 | | 12/2003 | Schwetz et al. | |

* cited by examiner

APPARATUS FOR MANUFACTURING POLE-PIECE POCKETS

RELATED APPLICATIONS

This application claims benefit of priority to International Application No. PCT/CN2009/074058 filed Sep. 21, 2009, which claims benefit of priority to Chinese Patent Application No. 200820214113.1 filed Nov. 28, 2008. All of the aforementioned applications are herein incorporated by reference.

FIELD OF THE INVENTION

The present invention relates to the field of battery manufacturing. More particularly, it relates to an apparatus for manufacturing pole-piece pockets of battery cells.

BACKGROUND OF THE INVENTION

Generally, in the manufacture of large-scale Li-ion power battery cells, the pole-piece pockets are manufactured before the pole-pieces are stacked. A method for such manufacture comprises wrapping a pre-clipped pole-piece with two films, vertically thermal-welding a single joint once in the manner of thermal welding, conducting a transversely thermal-welding to encapsulate the pole-piece of which the tab is exposed out. The deficiencies of such method are that the distance between two adjacent vertical welding joints and the quality of the pole-piece pockets cannot be ensured, and the risk of malfunction is high.

SUMMARY OF THE INVENTION

It is one objective of the present invention to provide an apparatus for manufacturing pole-piece pockets, which can produce high quality pole-piece pockets with high efficiency and can effectively decrease the risk of malfunction.

According to one aspect of the present invention, an apparatus for manufacturing pole-piece pockets is provided. The apparatus for manufacturing pole-piece pockets comprises: a framework; a pole-piece supplying assembly configured to supply pole-pieces; a pole-piece transporting and regulating assembly configured to pick, place and regulate the pole-pieces; a vertically thermal-welding assembly configured to thermally weld two lateral edges of a pole-piece pocket formed by films covering top and bottom surfaces of a pole-piece; a transversely thermal-welding assembly configured to thermally weld an opening and a base of the pole-piece pocket; a film clamping and drawing assembly configured to draw and pull the films; and a film cutting assembly configured to cut the films. The pole-piece supplying assembly, the pole-piece transporting and regulating assembly, the vertically thermal-welding assembly, the transversely thermal-welding assembly, the film clamping and drawing assembly, and the film cutting assembly are assembled on the framework and are arranged orderly according to the pole-piece pocket manufacturing process. The vertically thermal-welding assembly comprises a press welding cutter having two blades for simultaneously welding the two lateral edges of the pole-piece pocket. The transversely thermal-welding assembly comprises a first thermal welding cutter for welding the base of the pole-piece pocket and a second thermal welding cutter for welding the opening of the pole-piece pocket.

In another embodiment, the pole-piece supplying assembly may comprise at least two storing boxes, a rotating disc, a rotation actuator, an elevation actuator and an elevation transmission device. The storing boxes are installed on the rotating disc. The rotation actuator drives the rotating disc into rotation. The elevation actuator drives pole-pieces in the storing boxes to move up and down via the elevation transmission device.

In another embodiment, the rotation actuator may be a right servo-motor and the elevation actuator may be a left servo-motor. The elevation transmission device may comprise a movement conversion mechanism configured to convert a rotation movement to a linear movement, a pushing base and a rod. The left servo-motor, the movement conversion mechanism, the pushing base and the rod are connected orderly together, and the rod vertically extends up into the storing box which is in a supplying position.

In another embodiment, the vertically thermal-welding assembly may comprise an upper mold fastening base, an upper mold cylinder, an upper mold plate, a lower mold fastening base, a lower mold plate and a lower mold cylinder. The upper mold cylinder is installed to the upper mold fastening base fixed to the framework. The bottom of a free end of the upper mold cylinder is fixed to the upper mold plate. The press welding cutter is installed under the upper mold plate. The lower mold cylinder is installed to the lower mold fastening base fixed to the framework. The top of a free end of the lower mold cylinder is fixed to the lower mold plate.

In another embodiment, the vertically thermal-welding assembly may further comprise a first smooth connection shaft, a first linear bearing, a second smooth connection shaft and a second linear bearing. The first smooth connection shaft and the second smooth connection shaft are fitted in inners of the first linear bearing and the second linear bearing, respectively. Outers of the first linear bearing and the second linear bearing are fixed to the upper mold fastening base and the lower mold fastening base, respectively. The upper mold plate is fixed under a bottom of the first smooth connection shaft, and the lower mold plate is fixed on a top of the second smooth connection shaft.

In another embodiment, the transversely thermal-welding assembly may comprise an upper mold fastening base, an upper mold cylinder, an upper mold plate, a lower mold fastening base, a lower mold cylinder and a lower mold plate. The upper mold fastening base and the lower mold fastening base are fixed to the framework. The upper mold cylinder and the lower mold cylinder are respectively installed to the upper mold fastening base and the lower mold fastening base. The bottom of a free end of the upper mold cylinder is fixed to the upper mold plate. The top of a free end of the lower mold cylinder is fixed to the upper mold plate. The first and second thermal welding cutters are fixed to an upper surface of the lower mold plate facing the upper mold plate.

In another embodiment, the transversely thermal-welding assembly may further comprise a head pressure plate and springs. A sink is grooved at a center of a top surface of the lower mold plate. The first and second thermal welding cutters are positioned out of the sink. The head pressure plate is elastically supported in the sink by the springs, and the head pressure plate is higher than the first and second thermal welding cutters and the top surface of the lower mold plate in the case of relaxation of the springs.

In another embodiment, the pole-piece transporting and regulating assembly may comprise a transporting servo-motor, a screw pair, a left vacuum suction cylinder, a left vacuum suction, a right vacuum suction cylinder, a right vacuum suction, a fixed plate, a regulating block and a transporting and regulating assembly cylinder. The transporting servo-motor is directly connected to a lead screw of the screw pair. The left and right vacuum suction cylinders are hung to nuts of the screw pair via an installation plate. The left and right vacuum suction cylinders respectively drive the left and right vacuum suctions to linearly move up and down. A top surface of the fixed plate has a regulating region. The regulating block is located on the top surface of the fixed plate and out of the regulating region. The transporting and regulating assembly cylinder is directly connected to the regulating block and drives the regulating block to move forward and backward on the top surface of the fixed block.

In another embodiment, the pole-piece transporting and regulating assembly may comprise a left stopper and a right stopper. The left and right stoppers are separately installed on the lead screw of the screw pair, and the installation plate is positioned between the left and right stoppers.

In another embodiment, the film clamping and drawing assembly may comprise a fixed installation plate, two mechanical clamps, two clamping cylinders and a film clamping and drawing servo-motor. The fixed installation plate is fixed to the framework. The two mechanical clamps extend to each other on the respective sides. Each of the two mechanical clamps comprises an immobile lower portion and a moveable upper portion parallel to each other. The upper portions are fixed to moveable ends of the clamping cylinders. The two clamping cylinders are connected to different sides of the same synchronous strip via the respective slippers. The synchronous strip is driven by the film clamping and drawing servo-motor.

In another embodiment, the film cutting assembly may comprise a first installation bracket, a cutter, a cutter pad and a film cutting cylinder. The film cutting cylinder is installed to the first installation bracket fixed to the framework. The top of a moveable end of the film cutting cylinder and the cutter pad are fixed to each other, and the cutter is fixed on the cutter pad.

In another embodiment, the apparatus for manufacturing pole-piece pockets may further comprise a launching and transporting assembly configured to transport finished pole-piece pockets. The launching and transporting assembly comprises a second installation bracket, a launching and transporting servo-motor, a transporting belt and a launching slope plate. The launching and transporting servo-motor is installed to the second installation bracket fixed to the framework. The transporting belt is driven by the launching and transporting servo-motor. The launching slope plate is declining and located at an input end of the transporting belt.

In another embodiment, the apparatus for manufacturing pole-piece pockets may further comprise two film locating and tensioning assemblies configured to keep the tension of the films covering the top and bottom surfaces of a pole-piece. The film locating and tensioning assembly comprises a locating roller configured to locate a roll of film and a plurality of transporting rollers configured to define the moving direction of the film. One of the plurality of transporting rollers is moveable.

According to another aspect of the present invention, it is provided a vertically thermal-welding assembly of an apparatus for manufacturing pole-piece pockets. The vertically thermal-welding assembly comprises an upper mold fastening base, an upper mold cylinder, an upper mold plate, a press welding cutter, a lower mold fastening base, a lower mold plate and a lower mold cylinder. The upper mold cylinder is installed to the upper mold fastening base fixed to the framework. A bottom of a free end of the upper mold cylinder is fixed to the upper mold plate. The press welding cutter is installed under the upper mold plate. The lower mold cylinder is installed to the lower mold fastening base fixed to the framework. A top of a free end of the lower mold cylinder is fixed to the lower mold plate.

According to the present invention, the press welding cutter has two blades so that the two lateral edges of a pole-piece pocket can be welded in just one welding operation. Thus, the distance between two adjacent vertical welding joints, the parallelity and welding consistency of the two vertical welding joints, and the welding effect can be ensured. Moreover, the welding accuracy and manufacturing efficiency of the pole-piece pockets can be increased significantly, and the risk of malfunction is decreased.

DESCRIPTION OF THE PREFERRED EMBODIMENTS

Figure 1:
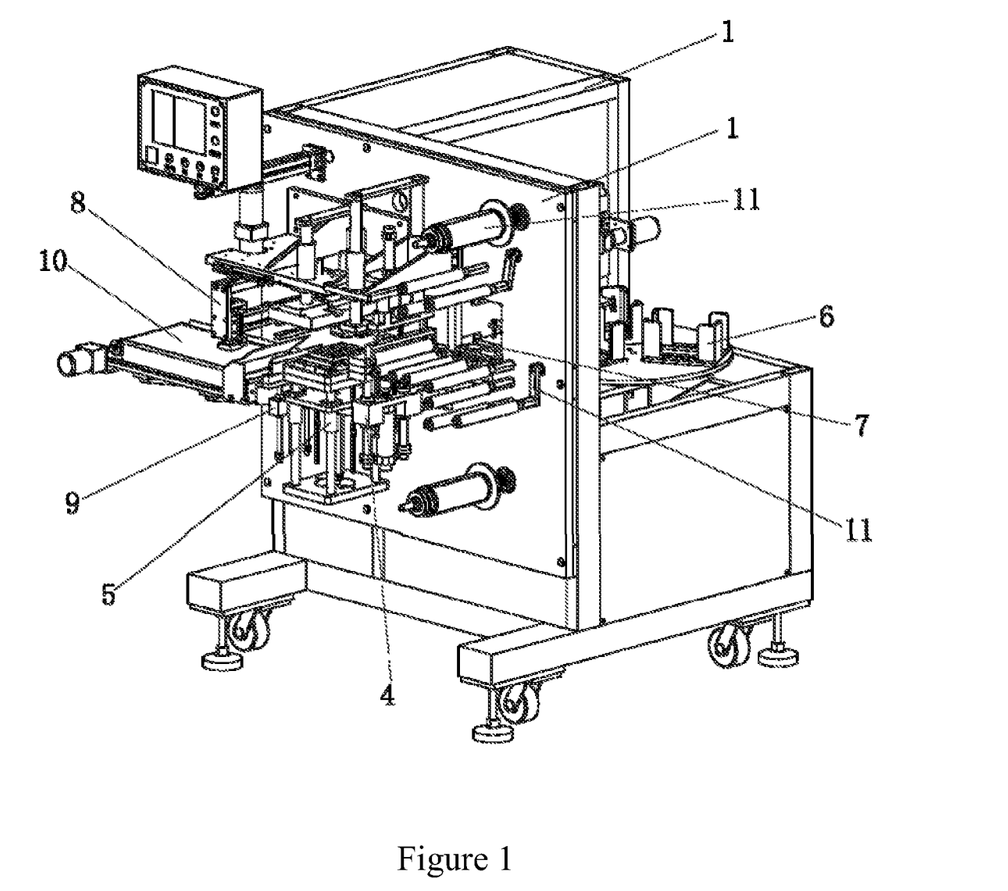
FIG. 1 is a perspective view of an apparatus according to an embodiment of the present invention.
Figure 2:
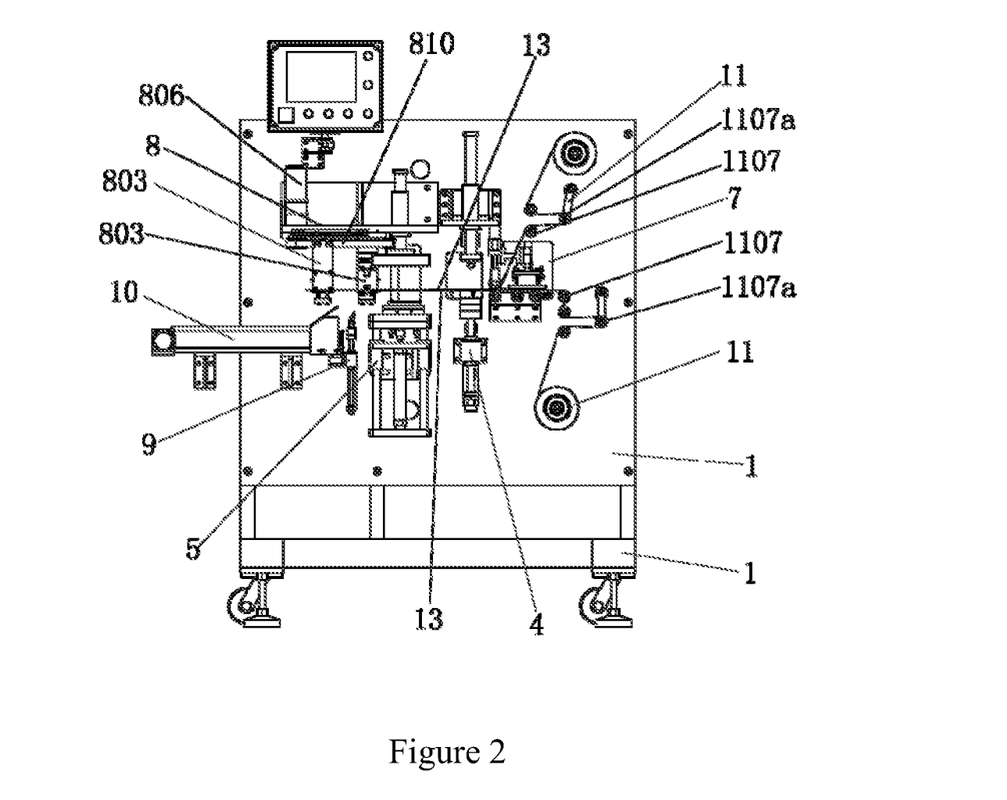
FIG. 2 is a front view of an apparatus according to an embodiment of the present invention.

As shown in FIGS. 1 and 2, an apparatus for manufacturing pole-piece pockets comprises a framework 1 and components orderly assembled on the framework 1 according to the process for manufacturing the pole-piece pockets. The components include a pole-piece supplying assembly 6, a pole-piece transporting and regulating assembly 7, a vertically thermal-welding assembly 4, a transversely thermal-welding assembly 5, a film clamping and drawing assembly 8, a film cutting assembly 9, a launching and transporting assembly 10 and a film locating and tensioning assembly 11. The assemblies are controlled by a control circuit such as a PLC circuit.

Figure 3:
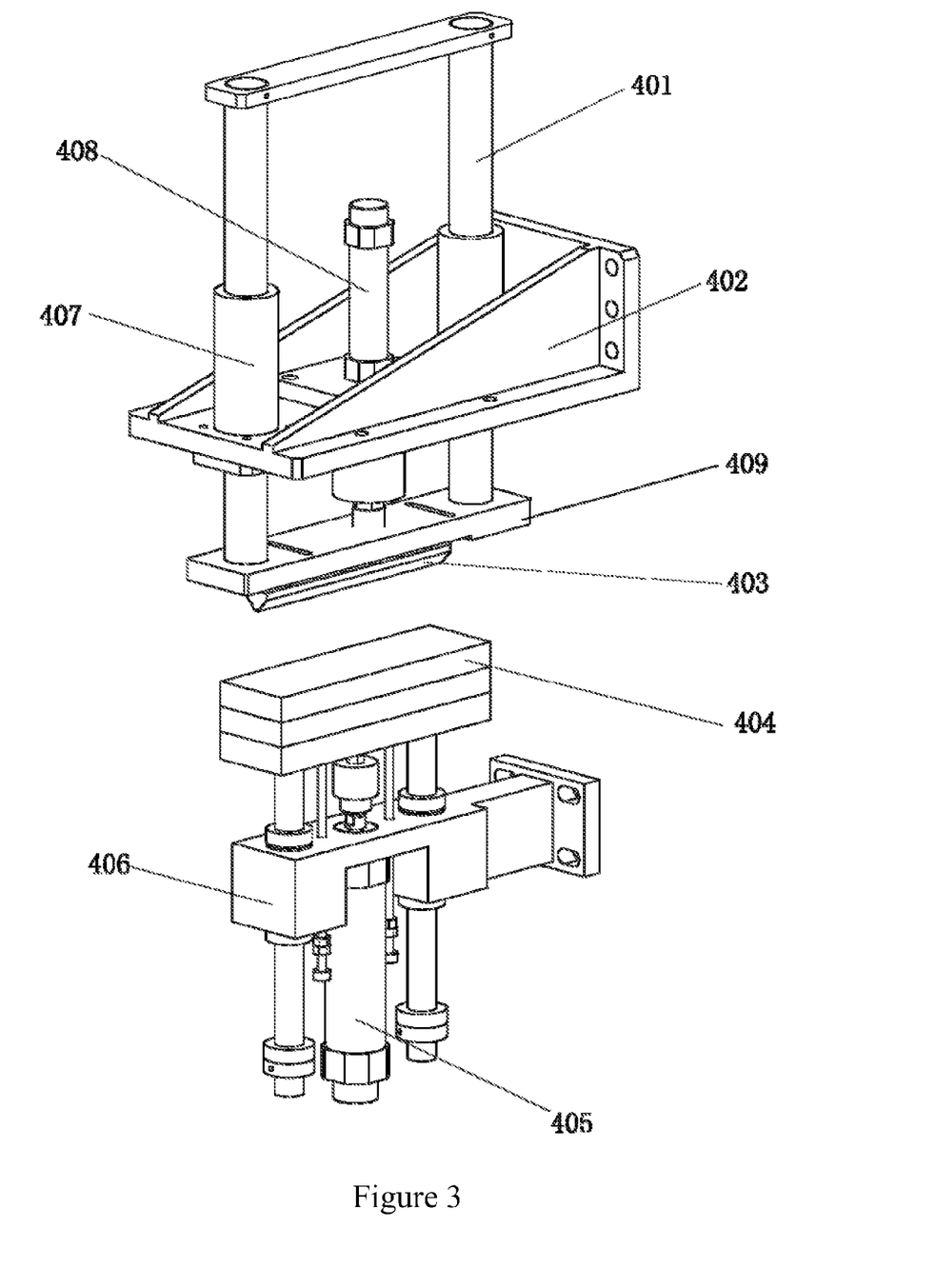
FIG. 3 is a perspective view of the vertically thermal-welding assembly according to an embodiment of the present invention.

As shown in FIG. 3, the vertically thermal-welding assembly 4 comprises a first smooth connection shaft 401, an upper mold fastening base 402, a press welding cutter 403, a lower mold plate 404, a lower mold cylinder 405, a lower mold fastening base 406, a first linear bearing 407, an upper mold cylinder 408 and an upper mold plate 409. The upper mold cylinder 405 is installed to the upper mold fastening base 402 installed to the framework 1. The bottom of a free end (e.g. a cylinder shaft) of the upper mold cylinder 408 is fixed to the upper mold plate 409. The press welding cutter 403 is fixed under the upper mold plate 409. With the movement of the upper mold cylinder 405, the press welding cutter 403 can vertically move up and down. To direct the linear movement of the press welding cutter 403, the lower mold plate 409 is fixed under the bottom of the first smooth connection shaft 401 fitted in the inner of the first linear bearing 407, and the outer of the first linear bearing 407 is fixed to the upper mold fastening base 402. The lower mold cylinder 405 is installed to the lower mold fastening base 406 installed to the framework 1. The top of a free end of the lower mold cylinder 405 is fixed to the lower mold plate 404. With the movement of the lower mold cylinder 405, the lower mold plate 404 can vertically move up and down. To direct the linear movement of the lower mold plate 404, a smooth connection shaft and a linear bearing may be provided. The press welding cutter 403 has two blades separate from each other. The interval of the two blades can be designed according to the size of the pole-piece pockets.

Moreover, the lower mold plate 409 may further include a silica gel layer capable of resisting high temperature and cushioning.

The PLC circuit controls vertically thermal-welding assembly so that the press welding cutter 403 and the lower mold plate 404 simultaneously move toward each other. Then, the two blades of the press welding cutter 403 thermally weld two lateral edges of a pole-piece pocket vertically and simultaneously. The pole-piece pocket comprises two films which cover the upper and lower surfaces of the pole-piece respectively. The pole-piece pocket has two lateral edges, an opening and a base.

Figure 4:
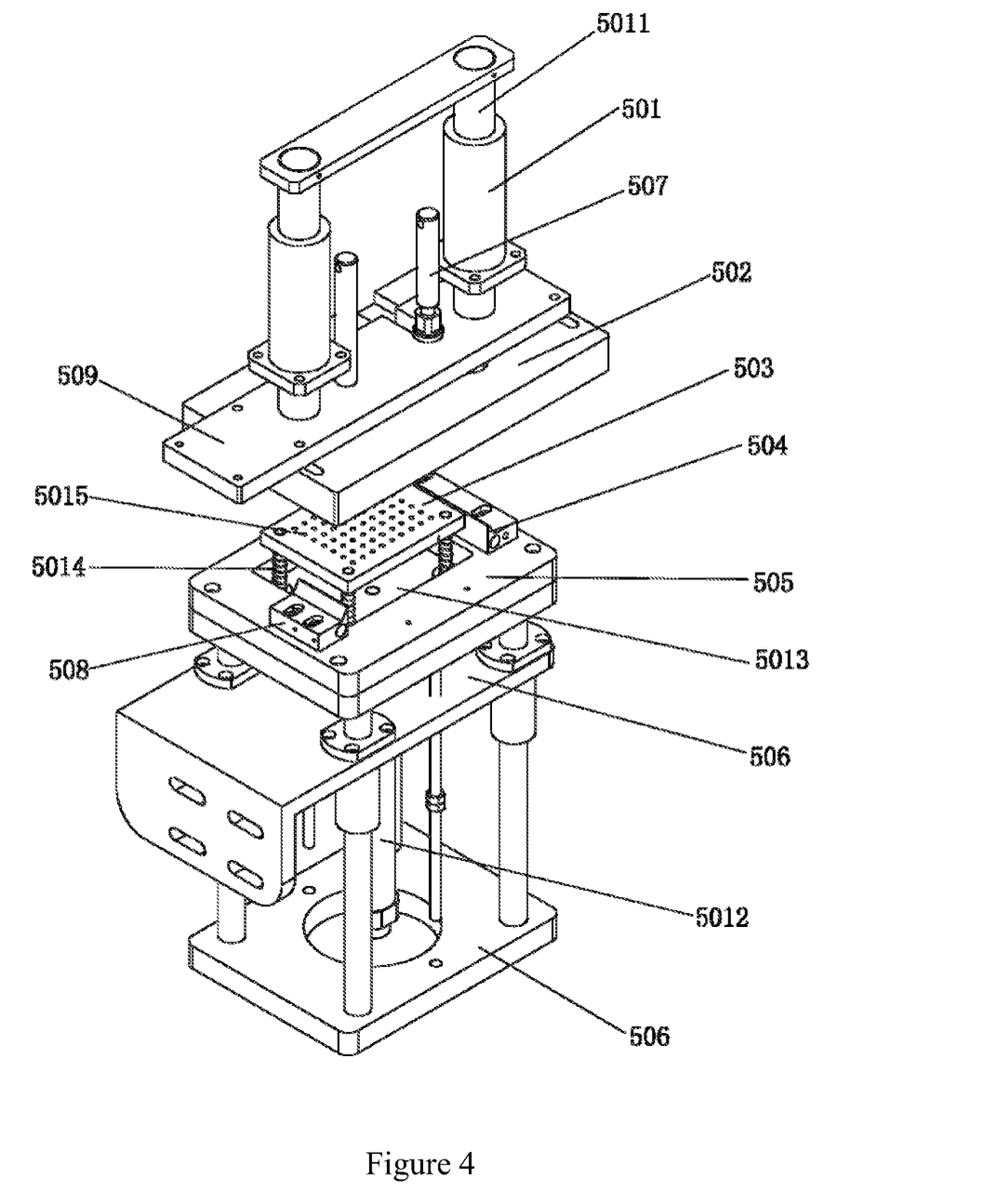
FIG. 4 is a perspective view of the transversely thermal-welding assembly according to an embodiment of the present invention.

As shown in FIG. 4, the transversely thermal-welding assembly 5 comprises a second linear bearing 501, an upper mold plate 502, a head pressure plate 503, a first thermal welding cutter 504, a lower mold plate 505, a lower mold fastening base 506, an upper mold cylinder 507, a second thermal welding cutter 508 and an upper mold fastening base 509. The upper mold cylinder 507 is installed to the upper mold fastening base 509 installed to the framework 1. The bottom of a free end of the upper mold cylinder 507 is fixed to the upper mold plate 502. With the movement of the upper mold cylinder 507, the upper mold plate 502 can vertically move up and down. To direct the linear movement of the upper mold plate 502, the upper mold plate 502 is fixed under the bottom of the second smooth connection shaft 5011 fitted in the inner of the second linear bearing 501, and the outer of the second linear bearing 501 is fixed to the upper mold fastening base 509. The lower mold cylinder 5012 is installed to the lower mold fastening base 506 installed to the framework 1. The top of a free end of the lower mold cylinder 5012 is fixed to the lower mold plate 505. With the movement of the lower mold cylinder 5012, the lower mold plate 505 can vertically move up and down. Moreover, the lower mold plate 505 may further include a silica gel layer capable of resisting high temperature and cushioning.

The first and second thermal welding cutters 504 and 508 are fixed to the upper surface of the lower mold plate 505 with a sink 5013 provided at the center thereof. The head pressure plate 503 is elastically supported in the sink 5013 by springs 5014. In the case of relaxation of the springs, the head pressure plate 503 is supported higher than the first and second thermal welding cutters 504 and 508 and the lower mold plate 505. The length of the first thermal welding cutter 504 is different from that of the second thermal welding cutter 508. The short one of the two thermal welding cutters is used to transversely and thermally weld the opening of the pole-piece pocket and the long one is used to transversely and thermally weld the base of the pole-piece pocket. The upper mold plate 502 is used to press the film on the pole-piece, and the lower mold plate 505 is used to press the film under the pole-piece. The head pressure plate 503 is used for cushioning and has a plurality of vacuum sucking holes 5015. Furthermore, in order to direct the linear movement of the lower mold plate, smooth connection shaft(s) and linear bearing(s) may be provided to be fitted to each other. Then, the lower mold plate is fixed to the smooth connection shaft(s) and linear bearing(s) are fixed to the lower mold fastening base.

In the process of thermal welding, the upper and lower mold plates simultaneously move toward each other. The short one of the two thermal welding cutters is used to thermally weld the opening of the pole-piece pocket and the long one is used to thermally weld the base of the pole-piece pocket. The tab of the pole-piece extends out of the pocket. The process of welding the pole-piece pocket is finished until the operation is completed based on preset parameters and reset.

Figure 5:
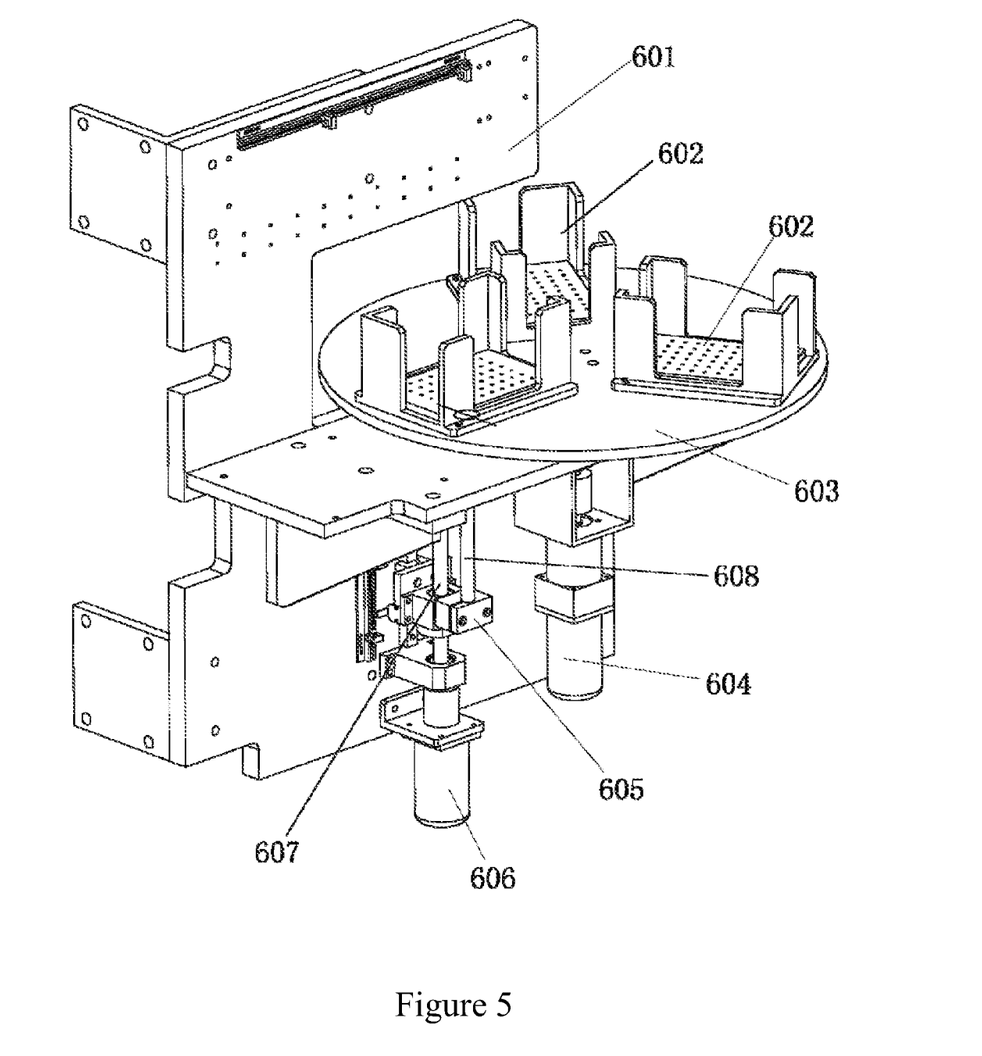
FIG. 5 is a perspective view of the pole-piece supplying assembly according to an embodiment of the present invention.

As shown in FIG. 5, the pole-piece supplying assembly 6 comprises a supplying assembly fastening base 601, storing boxes 602, a rotating disc 603, a right supplying servo-motor 604, a pushing base 605 and a left supplying servo-motor 606. The left and right supplying servo-motors 606 and 604 are installed to the supplying assembly fastening base 601 fixed to the framework 1. The storing boxes 602 are fixed on the rotating disc 603 which is rotated by the right supplying servo-motor 604. The left supplying servo-motor 606 is dynamically connected to the pushing base 605 via a movement transmission machine 607 such as a screw pair. A vertical rod 608 is fixed on the pushing base 605. Pole-pieces are located in the storing boxes 602 on the top of the rod 608. The movement transmission machine 607 is used to convert the input rotation movement to a linear movement to be output. At least two storing boxes 602 may be provided. The storing boxes may be distributed evenly. However, there also can be only one storing box so that the rotating disc and the servo-motor driving the rotating disc can be omitted.

The left supplying servo-motor 606 drives the rod 608 through the pushing base 605 so as to control the level of the pole-piece in the storing boxes 602.

Figure 6:
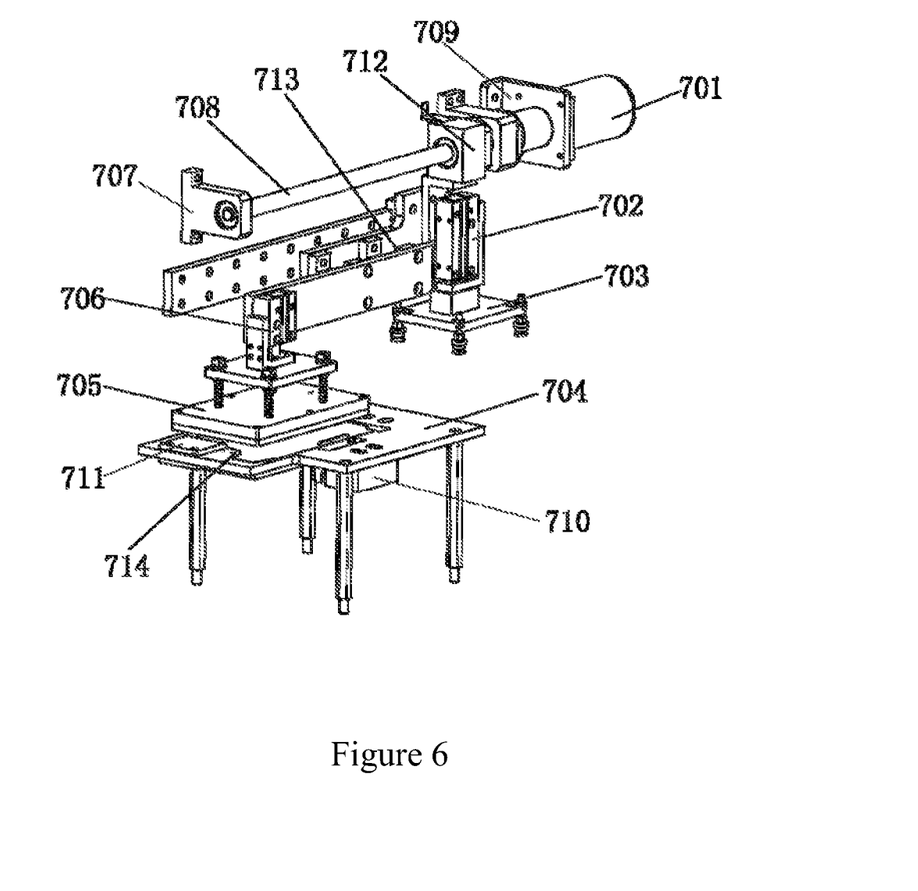
FIG. 6 is a perspective view of the pole-piece transporting and regulating assembly according to an embodiment of the present invention.

As shown in FIG. 6, the pole-piece transporting and regulating assembly 7 comprises a transporting servo-motor 701, a right vacuum suction cylinder 702, a right vacuum suction 703, a fixed plate 704, a left vacuum suction 705, a left vacuum suction cylinder 706, a left stopper 707, a lead screw 708, a right stopper 709, a transporting and regulating assembly cylinder 710 and a regulating block 711. The transporting servo-motor 701 is directly connected to the lead screw 708 of the screw pair. A nut 712 of the screw pair is immobile relative to an installation plate 713. The left and right vacuum suction cylinders 702 and 706 are separately installed to the installation plate 713. The left vacuum suction 705 is hung at the moveable end of the left vacuum suction cylinder 706 and the right vacuum suction 703 is hung at the moveable end of the right vacuum suction cylinder 702. Each of the vacuum suctions can be driven by its respective cylinder to vertically move up and down. The lead screw 708 is rotated by the transporting servo-motor 701 so that the left and right vacuum suction cylinders 702 and 706 linearly move left and right, so as to drive the left and right vacuum suctions 705 and 703 to linearly move left and right.

The left and right stoppers 707 and 709 are separated from each other and installed on the lead screw 708 of the screw pair. The left and right stoppers 707 and 709 can limit the track of the left and right vacuum suctions 705 and 703 so as to accurately locate the pole-piece onto the fixed plate 704.

The top surface of the fixed plate 704 is a plane. The center of the plane is a regulating region 714 with a vacuum sucking hole. The regulating block 711 is located on the top surface of the fixed plate 704 and out of the regulating region 714. The regulating block 711 is connected to the moveable end of the transporting and regulating assembly cylinder 710. Thus, the regulating block 711 can move forward and backward under the control of the transporting and regulating assembly cylinder 710 so as to regulate the pole-piece.

The pole-piece transporting and regulating assembly can prevent the thermal welding cutters from damaging the pole-piece in the subsequent operations and satisfy the requirements of process deviation for pole-piece pocket manufacturing.

Figure 7:
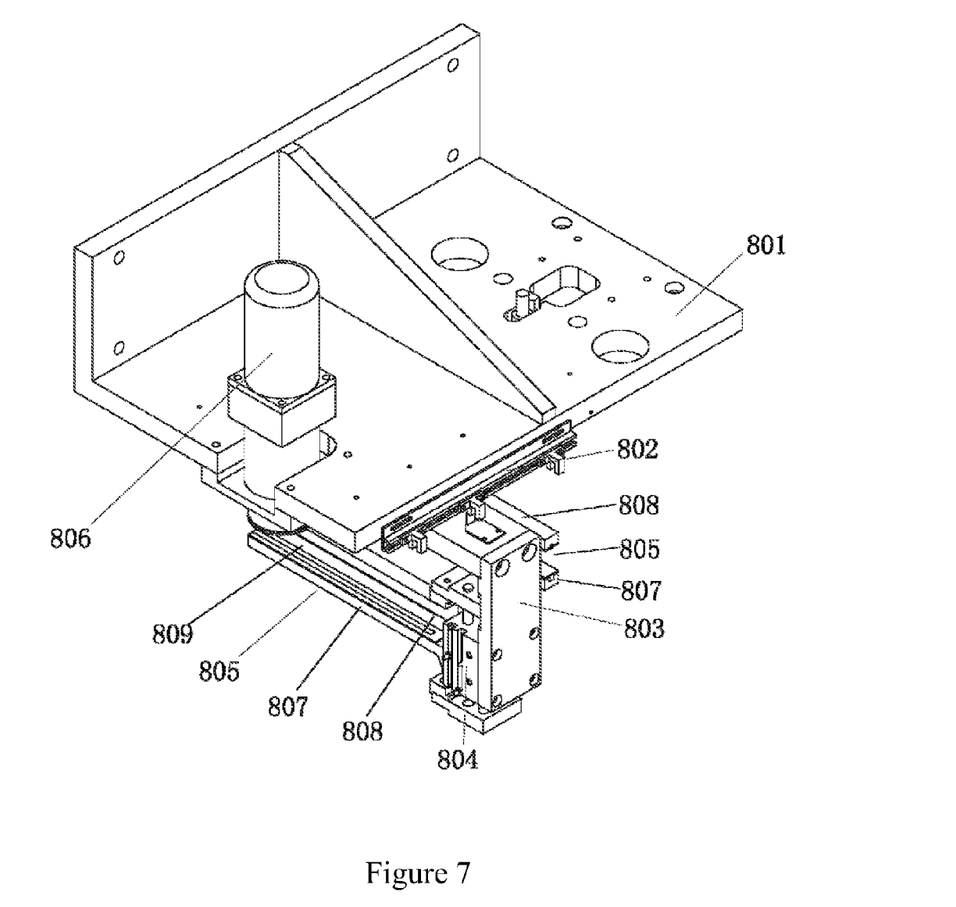
FIG. 7 is a perspective view of the film clamping and drawing assembly according to an embodiment of the present invention.

As shown in FIG. 7, the film clamping and drawing assembly 8 comprises a fixed installation plate 801, a sensor assembly 802, stoppers 803, clamping cylinders 804, mechanical clamps 805 and a film clamping and drawing servo-motor 806.

The fixed installation plate 801 is fixed to the framework 1.

The two mechanical clamps 805 include a left mechanical clamp and a right mechanical clamp which are disposed on left and right sides, respectively, and extend to each other. Each mechanical clamp 805 corresponds to a clamping cylinder 804 and comprises an immobile lower portion 807 and an upper portion 808 which can vertically move up and down. The upper and lower portions 808 and 807 are parallel to each other so as to form a gap 809 therebetween. The lower portion 807 of each mechanical clamp is immobile and the upper portion 808 of each mechanical clamp is installed to the moveable end of the corresponding clamping cylinder 804. When the clamping cylinder 804 operates, the upper portion 808 can vertically move up and down so as to change the width of the gap 809. The two clamping cylinders 804 are fixed to the corresponding stoppers 803, respectively. The two stoppers 803 are connected to different sides of the same synchronous strip 810 via respective slippers. The synchronous strip is driven by the film clamping and drawing servo-motor 806. The left and right mechanical clamps are located on different sides of the synchronous strip 810. Thus, during the operation of the synchronous strip 810, if the left mechanical clamp linearly move rightward, the right mechanical clamp linearly move leftward. On the contrary, if the left mechanical clamp linearly move leftward, the right mechanical clamp linearly move rightward.

The film is located in the gap 809 between the upper and lower portions of the left mechanical clamp.

The sensor assembly 802 is used to monitor the locations of the mechanical clamps 805.

When the film is clamped by the right mechanical clamp, the left mechanical clamp is open. In operation, the right mechanical clamp draws the film leftward through the gap of the left mechanical clamp and the left mechanical clamp moves rightward at the same time. When the left and right mechanical clamps exchange their relative positions, the left mechanical clamp is closed to clamp the film.

Figure 8:
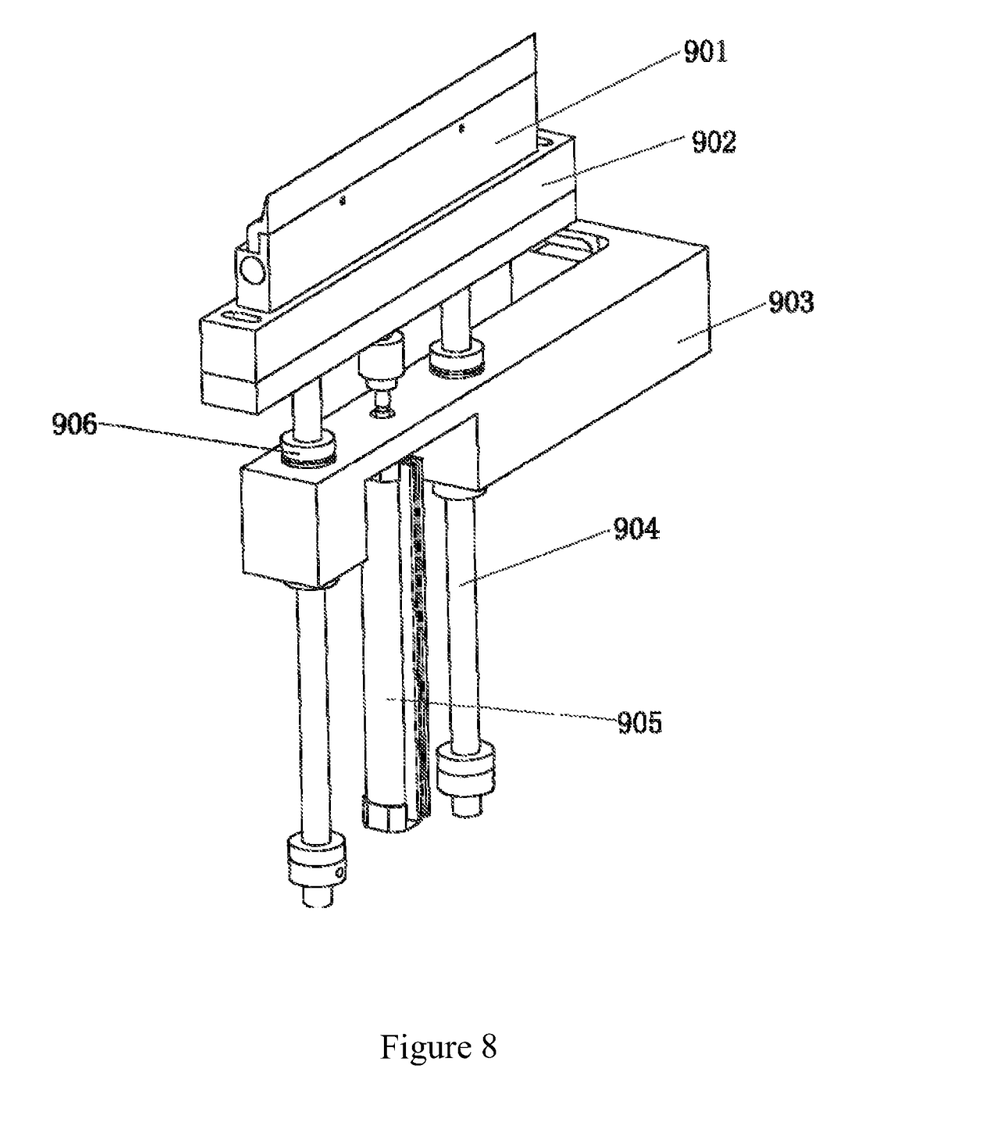
FIG. 8 is a perspective view of the film cutting assembly according to an embodiment of the present invention.

As shown in FIG. 8, the film cutting assembly 9 comprises a thermal cutter 901, a cutter pad 902, a first installation bracket 903, smooth shafts 904 and a film cutting cylinder 905. The film cutting cylinder 905 is installed to the first installation bracket 903 fixed to the framework 1. The thermal cutter 901 is fixed on the cutter pad 902 which is fixed on the top of the moveable end of the film cutting cylinder 905. To direct the linear movement of the cutter pad 902 and the thermal cutter 901, the cutter pad 902 is fixed on the top of the smooth shafts 904 fitted to linear bearings 906. The linear bearings 906 are fixed on the first installation bracket 903. The cutter pad 902 and the thermal cutter 901 can be driven by the film cutting cylinder 905 to vertically move up and down.

When the left and right mechanical clamps exchange their relative positions, the left mechanical clamp is closed to clamp the film. Then the thermal cutter 901 moves up to cut the welded pole-piece pocket off.

Figure 9:
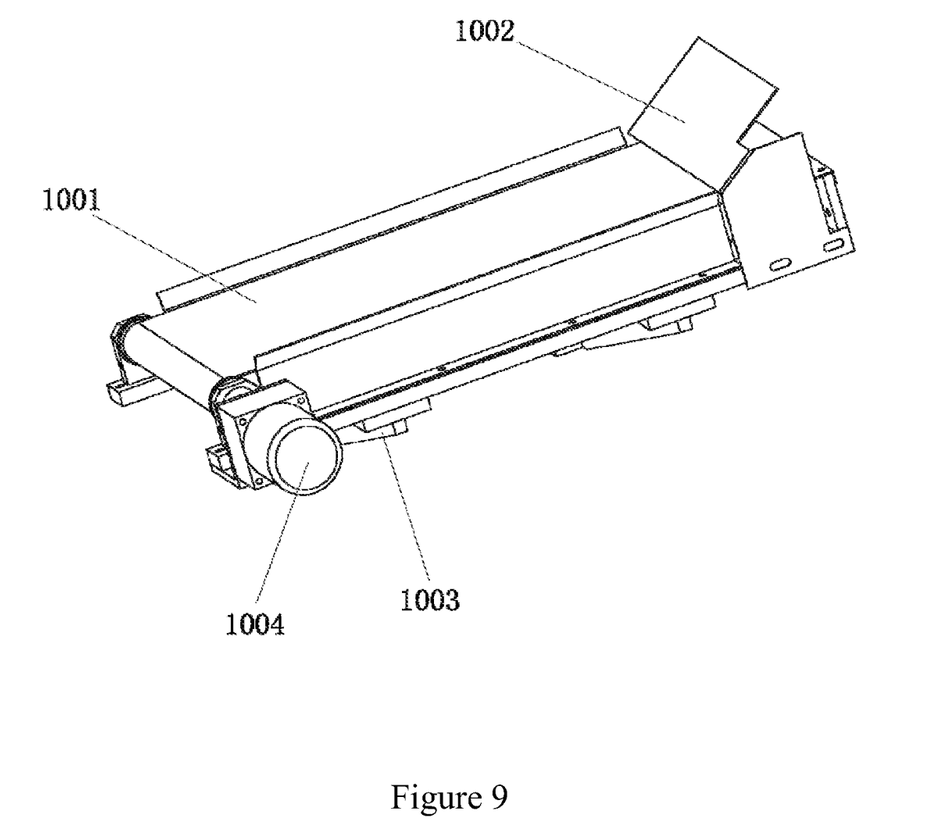
FIG. 9 is a perspective view of the launching and transporting assembly according to an embodiment of the present invention.

As shown in FIG. 9, the launching and transporting assembly 10 comprises a transporting belt 1001, a launching slope plate 1002, a second installation bracket 1003 and a launching and transporting servo-motor 1004. The launching and transporting servo-motor 1004 is installed to the second installation bracket 1003 fixed to the framework 1. The transporting belt 1001 is driven by the launching and transporting servo-motor 1004. The launching slope plate 1002 is located at the input end of the transporting belt 1001 and declining upward. The launching and transporting servo-motor 1004 drives the transporting belt 1001 to transport the finished pole-piece pockets.

After the film is cut off, the launching and transporting servo-motor drives the transporting belt to transport the finished pole-piece pockets. After this operation is completed, the right mechanical clamp is open.

Figure 10:
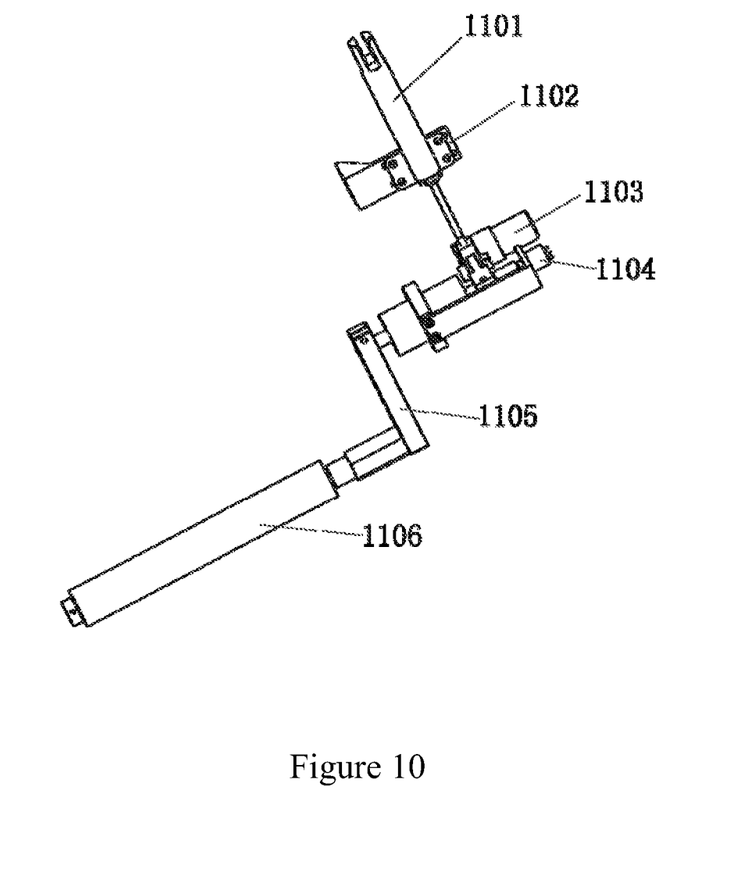
FIG. 10 is a perspective view of the film locating and tensioning assembly according to an embodiment of the present invention.

As shown in FIGS. 1, 2 and 10, the film locating and tensioning assembly 11 is used to drive the film to move and keep the tension of the film substantively constant. The film locating and tensioning assembly 11 may comprise a conventional film locating cylinder 1101, a film locating cylinder stopper 1102, a counterweight roller 1103, a locator 1104, a connection rod 1105, a locating roller 1106 and a plurality of transporting rollers 1107. The film locating cylinder 1101 is installed to the film locating cylinder stopper 1102 fixed to the framework 1. The transporting rollers include a moveable transporting roller 1107a. The counterweight roller 1103 and the moveable transporting roller 1107a are installed coaxially and driven by the film locating cylinder 1101 via the connection rod 1105. The locator 1104 is used to locate the moveable transporting roller 1107a.

The transporting rollers 1107 define the moving direction of the film. The tension of the film 13 can be adjusted by changing the position of the moveable transporting roller 1107a. Since both the top and bottom surfaces of the pole-piece should be covered with film 13, two film locating and tensioning assemblies are used to drive the films respectively covering the top and bottom surfaces of the pole-piece to move and keep the tension of the films substantively constant.

The Process of the Embodiment

1. Taking Pole-Pieces

As shown in FIGS. 5 and 6, three storing boxes 602 carrying clipped pole-pieces are provided on the rotating disc 603 of the pole-piece supplying assembly 6. The left supplying servo-motor 606 drives the rod 608 through the pushing base 605 so as to control the level of the pole-piece in the storing boxes 602 so that the pole-piece can be sucked. The sucking operation for the pole-pieces is completed by the left and right vacuum suctions 703 and 705. When the rod 608 pushes the pole-piece so that the sensor can detect the pole-piece, the pole-piece is sucked out of the storing box 602 and transported onto the top surface of the fixed plate 704 of the pole-piece transporting and regulating assembly 7 by the right vacuum suction 703. Then, the transporting servo-motor 701 drives the right vacuum suction 703 to suck the next pole-piece. To ensure the pole-piece to be located stably into a preset position for the next step, adjacent two sides of the pole-piece are oriented by the left stopper 707 and the right stopper 709. (That is, the left and right stoppers 707 and 709 limit the track of the left and right vacuum suctions 705 and 703 so as to accurately locate the pole-piece onto the regulating assembly 7.) During the regulating, the two regulating assembly cylinders 710 drive the regulating block 711 to regulate two sides of the pole-piece. After being located and regulated, the pole-piece is transported onto the film 13 by the left vacuum suction 705. The operation is repeated to realize continuous provision of the pole-pieces.

2. Welding for Manufacturing Pocket

As shown in FIGS. 3 and 4, the vertical thermal-welding is implemented. The press welding cutter 403, which is fixed relative to the upper mold fastening base 402 of the vertically thermal-welding assembly 4, is drove by the upper mold cylinder 408 to move up and down. A silica gel is provided on the lower mold plate 404. The lower mold cylinder 405 drives the lower mold plate 404 to move up and down. The PLC circuit controls vertically thermal-welding assembly 4 so that the press welding cutter 403 and the lower mold plate 404 move simultaneously. Then, the press welding cutter 403 thermally weld two lateral edges of a pole-piece pocket vertically and simultaneously. Since the two lateral edges of a pole-piece pocket can be welded in one welding operation, the welding efficiency is improved and the parallel welding joints and the consistency of welding are ensured. In the prior art, the two lateral edges is welded in two welding operations.

After the vertical thermal-welding, the film clamping and drawing assembly 7 drives the film 13 to the position set by the program for the next transverse thermal-welding. The operating principle of the transversely thermal-welding assembly 5 is similar to that of the vertically thermal-welding assembly 4. The difference therebetween is that the first and second thermal welding cutters 504 and 508 are installed on two ends of the lower mold plate 505 of the transversely thermal-welding assembly, respectively. The head pressure plate 503 is used for cushioning. A silica gel is provided on the upper mold plate 505. In the process of thermal welding, the upper and lower mold plates move simultaneously. The short one of the two thermal welding cutters is used to transversely and thermally weld the opening of the pole-piece pocket and the long one is used to transversely and thermally weld the base of the pole-piece pocket. The tab of the pole-piece extends out of the pocket. The process of welding the pole-piece pocket is finished until the operation is completed based on preset parameters and reset.

3. Driving Film, Cutting and Launching Completed Welded Pole-piece

As shown in FIGS. 7-10, the immobile portions of the left and right mechanical clamp of the film clamping and drawing assembly 8 are installed to the clamping cylinders 804 which is fixed to the stoppers 803 and then connected to the synchronous strip via the slippers. When the film 13 is clamped by the right mechanical clamp, the left mechanical clamp is open. In operation, the right mechanical clamp draws the film 13 to pass through the gap 809 of the left mechanical clamp (the film is in the gap 809 during the movement, that is, when the right mechanical clamp draws the film 13 through the gap of the left mechanical clamp, the film will be always in the gap of the left mechanical clamp) and the left mechanical clamp moves rightward at the same time (the left and right mechanical clamps are connected to two sides of one synchronous strip by the slippers, respectively, as stated above, and the reciprocating movements of the mechanical clamps are relative to each other and driven by the motor). When the left and right mechanical clamps 805 exchange their relative positions (due to the relative movement of the left and right mechanical clamps, wherein the positions of the left and right mechanical clamps are exchanged as the mechanical clamp at the right side move leftward through the gap of the other mechanical clamp at the left side), the left mechanical clamp is closed to clamp the film 13. The thermal cutter 901 of the film cutting assembly 9 moves up to cut the film 13 off. The launching and transporting servo-motor 1004 of the launching and transporting assembly 10 drives the transporting belt 1001 to complete the launching. After the launching operation is completed, the right mechanical clamp is open. Then, the above operation is repeated. During the movement of the film 13, the rotating speed of a feeding motor of the film locating and tensioning assembly 11 is controlled by the program in the PLC circuit so as to keep the tension of the film 13 substantively constant.

In the operations of the components, the PLC circuit is used to control and the sensor is used to detect the locations. For example, the PLC circuit and the sensor control and feedback to detect whether the cylinders are in suitable positions, to control the operating time of the thermal welding cutter and the thermal cutter, to control the movement track of the film clamping and drawing assembly, and to detect whether the pole-piece suction sucks a pole-piece. The temperature of the thermal welding cutter and the thermal cutter is accurately controlled by a temperature control device.

In the pole-piece manufacturing apparatus, vacuum suctions are used to suck a pole-piece and to transport the pole-piece between two films, a press welding cutter with two blades is used to perform a one-time vertical thermal-welding of the film, two thermal welding cutters with different lengths installed on two ends of the head pressure plate are then used to perform a transverse thermal-welding, and the film clamping and drawing structure is used to drive the film so that the thermal cutter may cut the film off to complete the manufacturing of the pole-piece pockets. During the manufacturing process, the PLC circuit controls the operations and time of the components. The temperature control of the thermal cutter does not impact the welding groove significantly. Since the two lateral edges of a pole-piece pocket is welded by two blades simultaneously, the distance between two adjacent vertical welding joints and the welding effect can be ensured, the welding accuracy and manufacturing efficiency of the cell pole-piece pockets can be increased significantly, and the risk of malfunction is decreased.

The present invention is not limited to the embodiments mentioned above. Other embodiments obtained by the skilled in the art according to the technical solutions in the present invention should be within the scope of the technical innovation of the present invention.

The invention claimed is:

1. An apparatus for manufacturing pole-piece pockets, comprising:
   a framework;
   a pole-piece providing assembly configured to provide pole-pieces;
   a pole-piece transporting and regulating assembly configured to pick, place and regulate the pole-pieces;
   a vertically thermal-welding assembly configured to thermally weld two lateral edges of a pole-piece pocket formed by films covering top and bottom surfaces of a pole-piece;
   a transversely thermal-welding assembly configured to thermally weld an opening and a base of the pole-piece pocket;
   a film clamping and drawing assembly configured to draw and pull the films; and
   a film cutting assembly configured to cut the films,
   wherein the pole-piece providing assembly, the pole-piece transporting and regulating assembly, the vertically thermal-welding assembly, the transversely thermal-welding assembly, the film clamping and drawing assembly, and the film cutting assembly are assembled to the framework and arranged orderly according to a pole-piece pocket manufacturing process, the vertically thermal-welding assembly comprises a press welding cutter having two blades for simultaneously welding the two lateral edges of the pole-piece pocket, and the transversely thermal-welding assembly comprises a first thermal welding cutter for welding the base of the pole-piece pocket and a second thermal welding cutter for welding the opening of the pole-piece pocket.

2. The apparatus of claim 1, wherein the pole-piece providing assembly comprises at least two storing boxes, a rotating disc, a rotation actuator, an elevation actuator and an elevation transmission device, the storing boxes are installed on the rotating disc, the rotation actuator drives the rotating disc into rotation, and the elevation actuator drives pole-pieces in the storing boxes to move up and down via the elevation transmission device.

3. The apparatus of claim 2, wherein the rotation actuator is a right servo-motor, the elevation actuator is a left servo-motor, the elevation transmission device comprises a movement conversion mechanism configured to convert a rotation movement to a linear movement, a pushing base and a rod, and wherein the left servo-motor, the movement conversion mechanism, the pushing base and the rod are connected orderly together, and the rod vertically extends up into the storing box which is in a providing position.

4. The apparatus of claim 1, wherein the vertically thermal-welding assembly comprises an upper mold fastening base, an upper mold cylinder, an upper mold plate, a lower mold fastening base, a lower mold plate and a lower mold cylinder, the upper mold cylinder is installed to the upper mold fastening base fixed to the framework, a bottom of a free end of the upper mold cylinder is fixed to the upper mold plate, the press welding cutter is installed under the upper mold plate, the lower mold cylinder is installed to the lower mold fastening base fixed to the framework, and a top of a free end of the lower mold cylinder is fixed to the lower mold plate.

5. The apparatus of claim 4, wherein the vertically thermal-welding assembly further comprises a first smooth connection shaft, a first linear bearing, a second smooth connection shaft and a second linear bearing, the first smooth connection shaft and the second smooth connection shaft are fitted in inners of the first linear bearing and the second linear bearing, respectively, outers of the first linear bearing and the second linear bearing are fixed to the upper mold fastening base and the lower mold fastening base, respectively, the upper mold plate is fixed under a bottom of the first smooth connection shaft, and the lower mold plate is fixed on a top of the second smooth connection shaft.

6. The apparatus of claim 1, wherein the transversely thermal-welding assembly comprises an upper mold fastening base, an upper mold cylinder, an upper mold plate, a lower mold fastening base, a lower mold cylinder and a lower mold plate, the upper mold fastening base and the lower mold fastening base are fixed to the framework, the upper mold cylinder and the lower mold cylinder are respectively installed to the upper mold fastening base and the lower mold fastening base, a bottom of a free end of the upper mold cylinder is fixed to the upper mold plate, a top of a free end of the lower mold cylinder is fixed to the upper mold plate, and the first and second thermal welding cutters are fixed to an upper surface of the lower mold plate facing the upper mold plate.

7. The apparatus of claim 6, wherein the transversely thermal-welding assembly further comprises a head pressure plate and springs, a sink is grooved at a center of a top surface of the lower mold plate, the first and second thermal welding cutters are positioned out of the sink, the head pressure plate is elastically supported in the sink by the springs, and the head pressure plate is higher than the first and second thermal welding cutters and the top surface of the lower mold plate in the case of relaxation of the springs.

8. The apparatus of claim 1, wherein the pole-piece transporting and regulating assembly comprises a transporting servo-motor, a screw pair, a left vacuum suction cylinder, a left vacuum suction, a right vacuum suction cylinder, a right vacuum suction, a fixed plate, a regulating block and a transporting and regulating assembly cylinder, the transporting servo-motor is directly connected to a lead screw of the screw pair, the left and right vacuum suction cylinders are hung to nuts of the screw pair via an installation plate, the left and right vacuum suction cylinders respectively drive the left and right vacuum suctions to linearly move up and down, a top surface of the fixed plate has a regulating region, the regulating block is located on the top surface of the fixed plate and out of the regulating region, and the transporting and regulating assembly cylinder is directly connected to the regulating block and drives the regulating block to move forward and backward on the top surface of the fixed block.

9. The apparatus of claim 8, wherein the pole-piece transporting and regulating assembly comprises a left stopper and a right stopper, the left and right stoppers are separately installed on the lead screw of the screw pair, and the installation plate is positioned between the left and right stoppers.

10. The apparatus of claim 1, wherein the film clamping and drawing assembly comprises a fixed installation plate, two mechanical clamps, two clamping cylinders and a film clamping and drawing servo-motor, the fixed installation plate is fixed to the framework, the two mechanical clamps extend to each other on the respective sides, each of the two mechanical clamps comprises an immobile lower portion and a moveable upper portion parallel to each other, the upper portions are fixed to moveable ends of the clamping cylinders, the two clamping cylinders are connected to different sides of the same synchronous strip via the respective slippers, and the synchronous strip is driven by the film clamping and drawing servo-motor.

11. The apparatus of claim 1, wherein the film cutting assembly comprises a first installation bracket, a cutter, a cutter pad and a film cutting cylinder, the film cutting cylinder is installed to the first installation bracket fixed to the framework, a top of a moveable end of the film cutting cylinder and the cutter pad are fixed to each other, and the cutter of the film cutting assembly is fixed on the cutter pad.

12. The apparatus of claim 1, further comprising a launching and transporting assembly configured to transport finished pole-piece pockets, wherein the launching and transporting assembly comprises a second installation bracket, a launching and transporting servo-motor, a transporting belt and a launching slope plate, the launching and transporting servo-motor is installed to the second installation bracket fixed to the framework, the transporting belt is driven by the launching and transporting servo-motor, and the launching slope plate is declining and located at an input end of the transporting belt.

13. The apparatus of claim 1, further comprising two film locating and tensioning assemblies configured to keep the tension of the films covering the top and bottom surfaces of a pole-piece, the film locating and tensioning assembly comprises a locating roller configured to locate a roll of film and a plurality of transporting rollers configured to define the moving direction of the film, and one of the plurality of transporting rollers is moveable.

* * * * *